United States Patent
Ratnakaram et al.

(10) Patent No.: US 10,366,279 B2
(45) Date of Patent: Jul. 30, 2019

(54) SYSTEM FOR EXECUTION OF MULTIPLE EVENTS BASED ON IMAGE DATA EXTRACTION AND EVALUATION

(71) Applicant: Bank of America Corporation, Charlotte, NC (US)

(72) Inventors: Udaya Kumar Raju Ratnakaram, Hyderabad (IN); Nagasubramanya Lakshminarayana, Hyderabad (IN); Pinak Chakraborty, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 102 days.

(21) Appl. No.: 15/688,995

(22) Filed: Aug. 29, 2017

(65) Prior Publication Data

US 2019/0065832 A1     Feb. 28, 2019

(51) Int. Cl.
*G06K 9/00*     (2006.01)
(52) U.S. Cl.
CPC ..... *G06K 9/00288* (2013.01); *G06K 9/00275* (2013.01); *G06K 2009/00322* (2013.01)
(58) Field of Classification Search
CPC ........... G06K 9/00288; G06K 9/00275; G06K 2009/00322
See application file for complete search history.

(56) References Cited

U.S. PATENT DOCUMENTS

| | | |
|---|---|---|
| 5,680,481 A | 10/1997 | Prasad et al. |
| 6,816,611 B1 | 11/2004 | Hagiwara et al. |
| 6,882,741 B2 | 4/2005 | Dobashi et al. |
| 7,274,822 B2 | 9/2007 | Zhang et al. |
| 7,519,200 B2 | 4/2009 | Gokturk et al. |
| 7,756,334 B2 | 7/2010 | Kim et al. |
| 7,783,135 B2 | 8/2010 | Gokturk et al. |
| 7,809,192 B2 | 10/2010 | Gokturk et al. |
| 7,853,100 B2 | 12/2010 | Sundstrom et al. |
| 8,125,509 B2 | 2/2012 | Kenoyer |
| 8,180,112 B2 | 5/2012 | Kurtz et al. |
| 8,185,646 B2 | 5/2012 | Headley |
| 8,189,880 B2 | 5/2012 | Wen et al. |
| 8,208,764 B2 | 6/2012 | Guckenberger |
| 8,285,006 B2 | 10/2012 | Tang |
| 8,531,536 B2 | 9/2013 | Hymel et al. |
| 8,582,828 B2 | 11/2013 | Panzer et al. |
| 8,639,719 B2 | 1/2014 | Fisher et al. |
| 8,756,161 B2 | 6/2014 | Hasson et al. |
| 8,774,528 B2 | 7/2014 | Hibino et al. |
| 8,861,804 B1 | 10/2014 | Johnson et al. |
| 9,177,209 B2 | 11/2015 | Chang et al. |

(Continued)

*Primary Examiner* — Qian Yang
(74) *Attorney, Agent, or Firm* — Michael A. Springs; Moore & Van Allen PLLC; Nicholas C. Russell

(57) ABSTRACT

Embodiments of the present invention provide a system for executing multiple events in response to receiving an image and extracting identity and contact information from that image. As such, a facial recognition and image hashing process is applied to an image of multiple individuals associated with the multiple events to extract image hashes for each individual. These image hashes are then compared to known, stored image hashes to determine an identity and contact information for each individual. Once this information is collected, the system executes the multiple events based on the determined information about each individual.

20 Claims, 5 Drawing Sheets

(56) References Cited

U.S. PATENT DOCUMENTS

| | | |
|---|---|---|
| 9,286,641 B2 | 3/2016 | Bosworth et al. |
| 2005/0129334 A1 | 6/2005 | Wilder et al. |
| 2005/0201595 A1 | 9/2005 | Kamei |
| 2009/0202105 A1 | 8/2009 | Castro et al. |
| 2012/0213404 A1 | 8/2012 | Steiner |
| 2016/0125383 A1* | 5/2016 | Chan .................. G06Q 20/3224 705/39 |
| 2018/0365682 A1* | 12/2018 | Ball ..................... G06Q 20/353 |
| 2019/0020468 A1* | 1/2019 | Rosenoer .................. H04L 9/06 |

* cited by examiner

SYSTEM FOR EXECUTION OF MULTIPLE EVENTS BASED ON IMAGE DATA EXTRACTION AND EVALUATION

BACKGROUND

Executing events for multiple individuals manually requires multiple iterations of time-intensive entries that are prone to inadvertent errors. However, as people tend to record significant occasions that may be associated with a need to execute events with a group of individuals by taking a group photograph, this record can be used to expedite the process of executing the events while reducing the burden on the user and reducing the potential for errors.

Therefore, a need exists to extract data from images, evaluate the image data to identify known individuals, identify contact data for those individuals, and use this contact data to execute multiple events for those individuals.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for execution of multiple events based on image data extraction and evaluation. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve receive, from a computing device of a user, a prompt to request a contribution from one or more individuals and receiving, from the computing device of the user, an image that includes the one or more individuals. Next, the system may determine an identity for each of the one or more individuals in the image by applying a facial recognition process to the image to extract image hashes for each face in the image and comparing the extracted image hashes to stored hashes of the computing device of the user or to stored hashes of a social network of the user. Furthermore, the system may identify contact information for each of the one or more individuals based on the identity of each of the one or more individuals, and then transmit the request for the contribution to each individual of the one or more individuals using the contact information.

In some embodiments, the system is additionally configured to determine that a first extracted image hash of the extracted image hashes is not associated with the stored hashes of the computing device of the user or with the stored hashes of the social network of the user. In response to this determination, the system may cause the computing device of the user to display a portion of the image associated with the first image hash. Additionally, the system may cause the computing device of the user to request an input of a new identity and a new contact information associated with the first extracted image hash. The system may then receive, from the computing device of the user, the new contact information.

In some embodiments, the system is additionally configured to determine that a first extracted image hash of the extracted image hashes at least partially matches with two or more of the stored hashes of the computing device of the user or the stored hashes of the social network of the user. In response to this determination, the system may cause the computing device of the user to display a portion of the image associated with the first image hash. The system can additionally cause the computing device of the user to display identities associated with the two or more stored hashes, and/or cause the computing device of the user to request a user input of a correct identity of the displayed identities associated with the two or more stored hashes. Next, the system can receive, from the computing device of the user, the user input of the correct identity, and associate the correct identity with the first extracted image hash.

In some embodiments, the system may, in response to identifying contact information for each individual of the identified one or more individuals, cause the computing device of the user to display the identity and contact information for each of the one or more individuals in the image. Next, the system may cause the computing device of the user to display a request for a user input of a respective contribution amount for each individual of the one or more individuals. Furthermore, the system may receive, from the computing device of the user, the user input of the respective contribution amount for each individual of the one or more individuals. In some such embodiments, the step of transmitting the request for the contribution to each individual of the identified one or more individuals comprises transmitting a request for the respective contribution amount to each individual of the one or more individuals.

Furthermore, in some embodiments of the system, the contribution comprises an equal distribution amount for each individual of the one or more individuals. In some such embodiments.

And finally, in some embodiments of the system, the identity of the identified one or more individuals includes an identity of the user. In some such embodiments, the system does not transmit the request for the contribution to the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
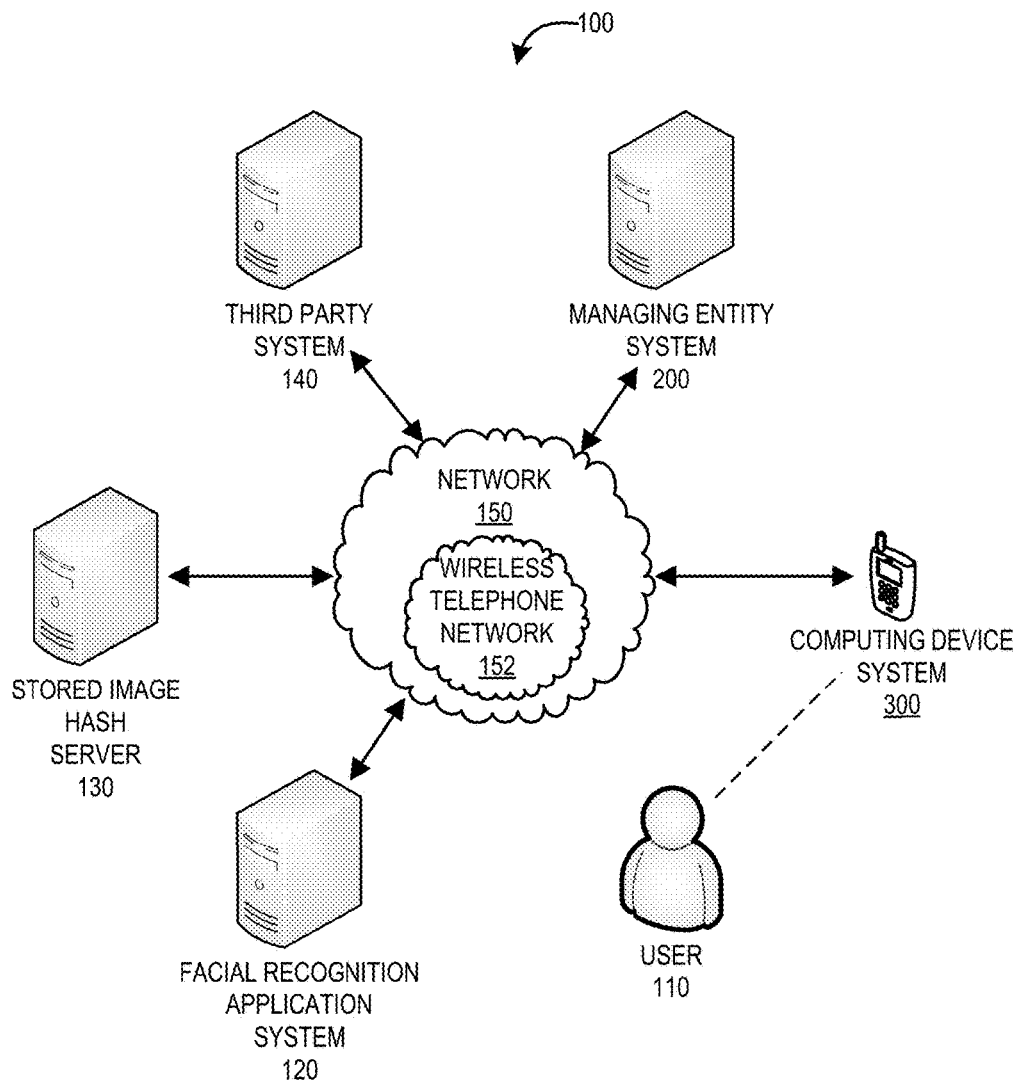
Figure 2:
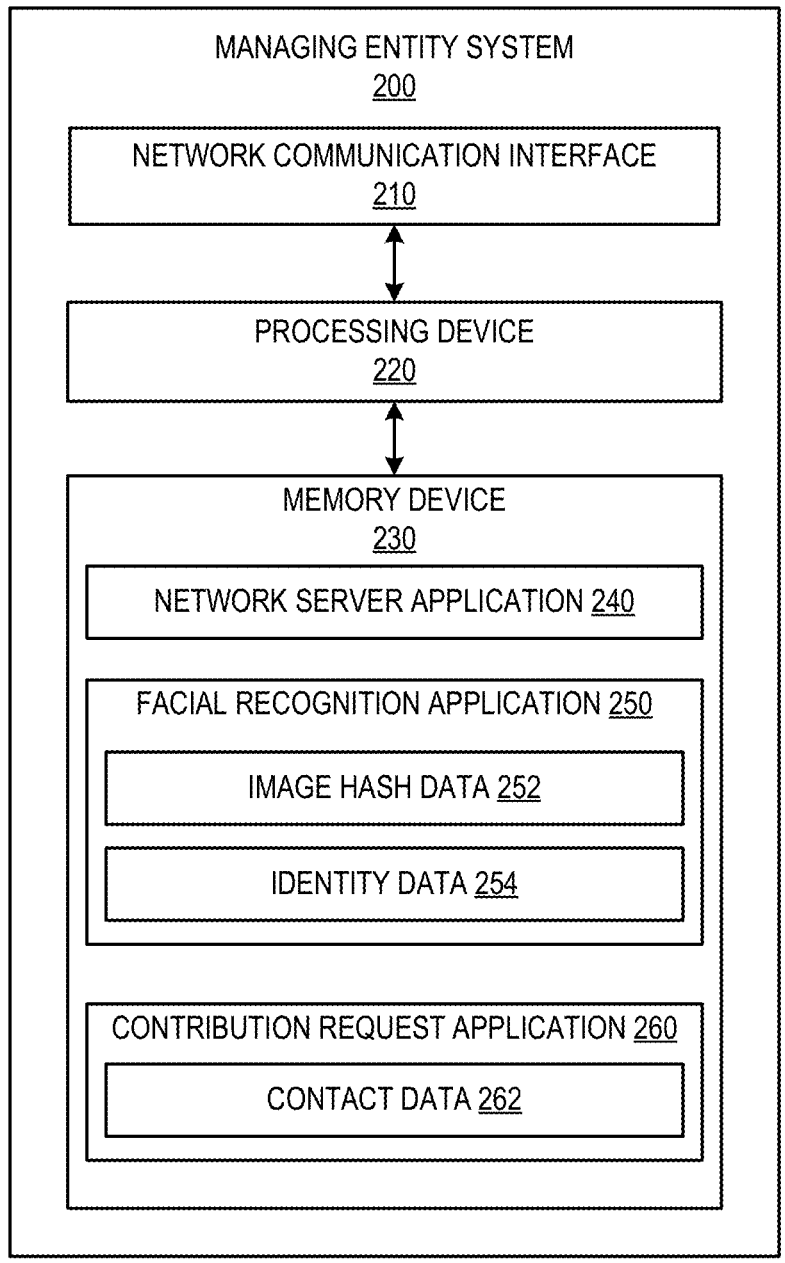
Figure 3:
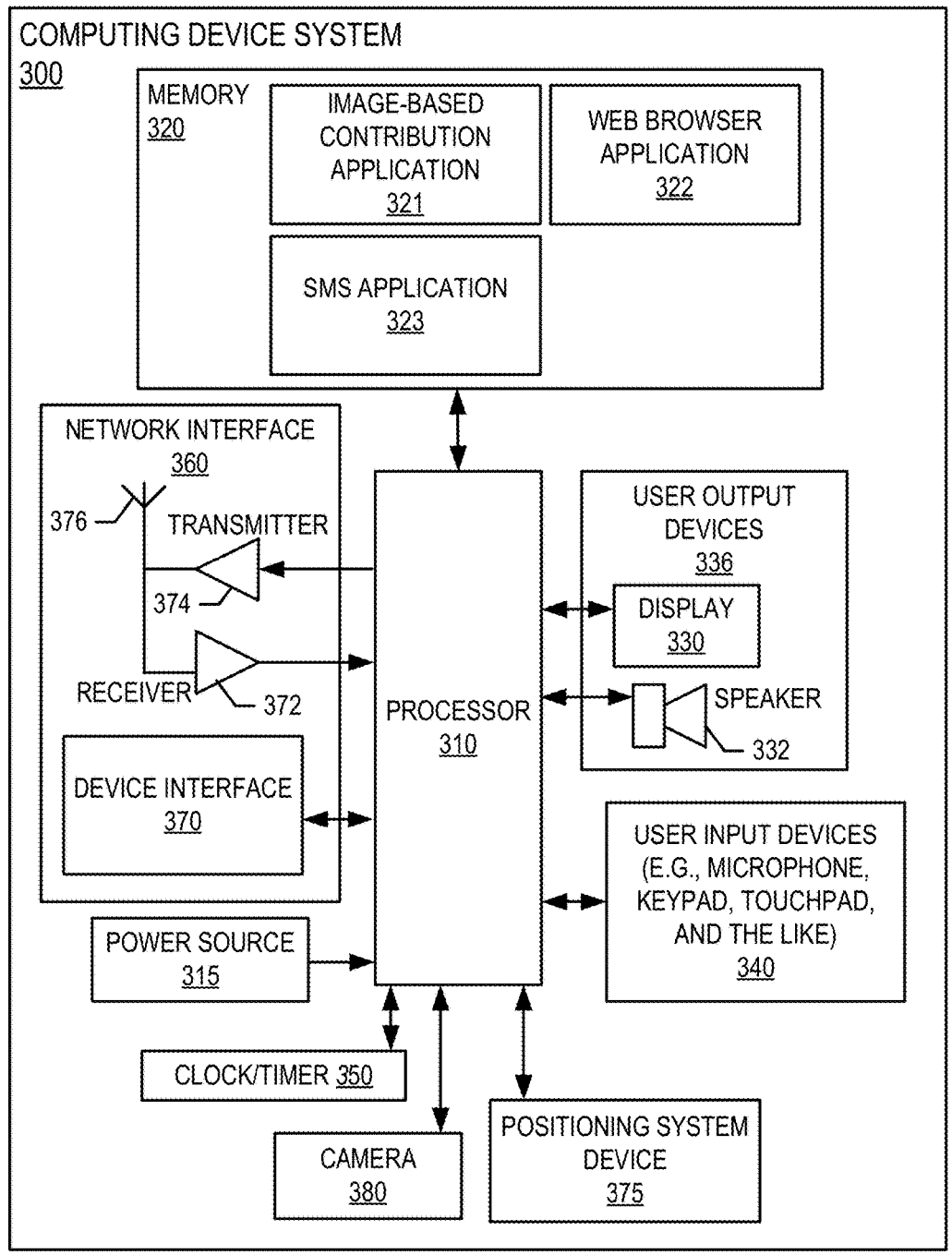
Figure 4:
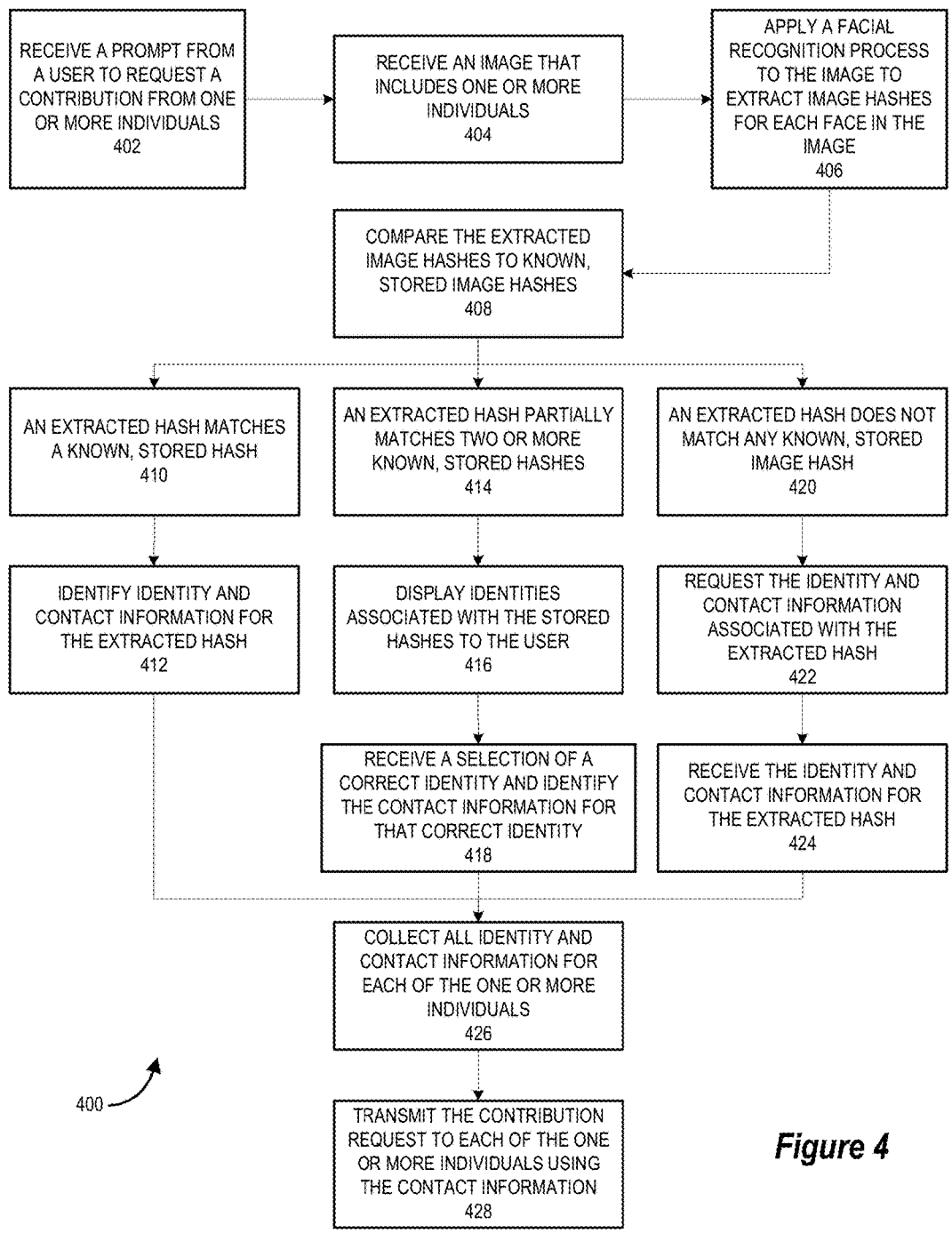
Figure 5:
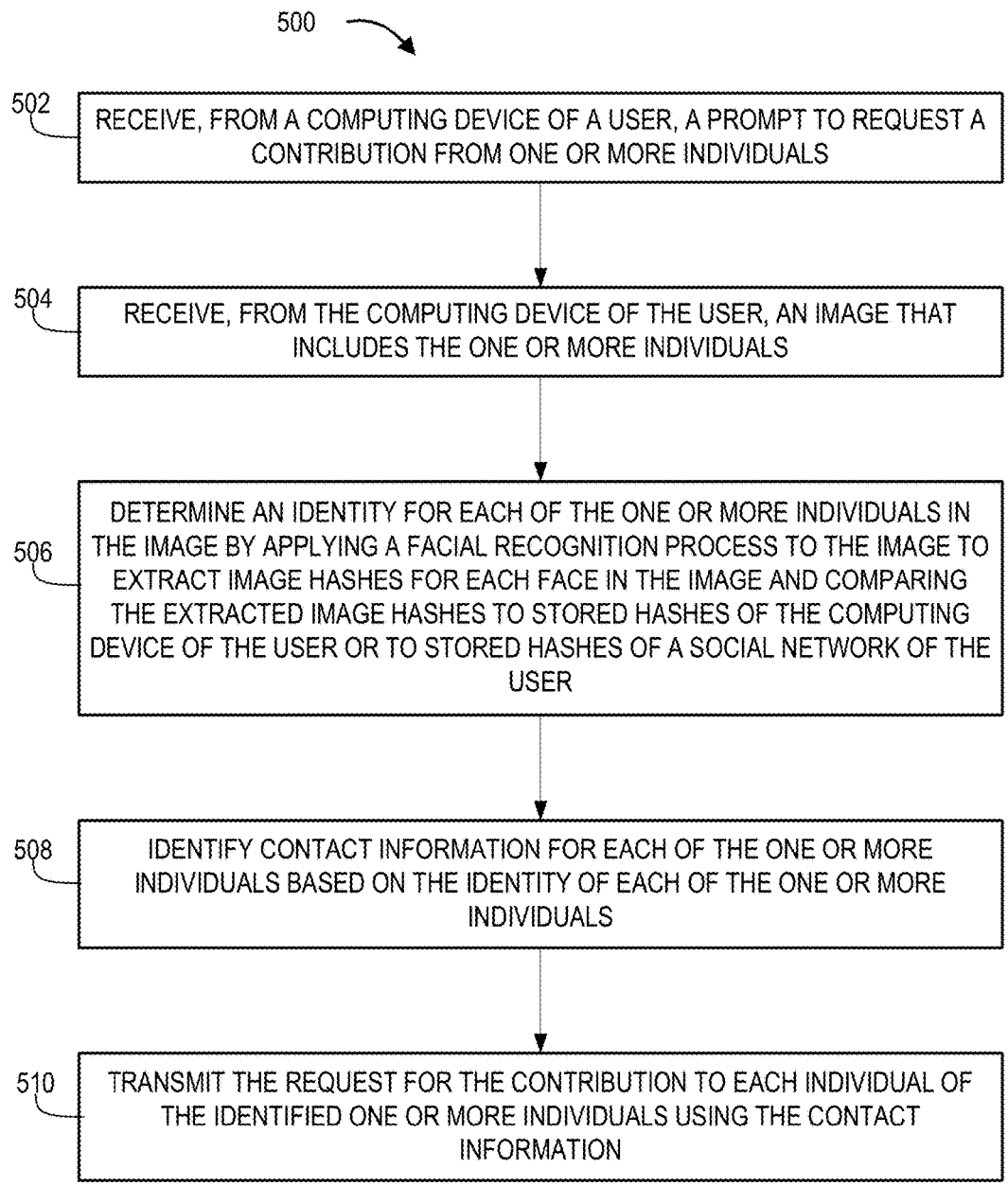

Having thus described embodiments of the invention in general terms, reference will now be made the accompanying drawings, wherein:

FIG. 1 provides a block diagram illustrating a system environment for executing of multiple events based on image data extraction and evaluation, in accordance with an embodiment of the invention;

FIG. 2 provides a block diagram illustrating the managing entity system of FIG. 1, in accordance with an embodiment of the invention;

FIG. 3 provides a block diagram illustrating the computing device system of FIG. 1, in accordance with an embodiment of the invention;

FIG. 4 provides a flow chart illustrating a process for facilitating the executing multiple events based on image data extraction and evaluation, in accordance with an embodiment of the invention; and FIG. 5 provides a flow chart illustrating a process for facilitating the execution of multiple events based on image data extraction and evaluation, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide a system for executing multiple events in response to receiving an image and extracting identity and contact information from that image. As such, a facial recognition and image hashing process is applied to an image of multiple individuals associated with the multiple events to extract image hashes for each individual. These image hashes are then compared to known, stored image hashes to determine an identity and contact information for each individual. Once this information is collected, the system executes the multiple events based on the determined information about each individual.

As such, the system may extract image hashes for mobile phone and social network contacts or connections of a user, and store these known image hashes, along with identity and contact information in a database. The system can then receive an image of multiple individuals (e.g., an image from a group dinner, a party, some other event where the user made a payment and would like reimbursement from the other individuals, where the individuals can contribute to a charity, or the like). The system then applies a facial recognition and image hashing process to the received image to extract image hashes from the received image.

The newly extracted image hashes are then compared with the stored image hashes. If a confident match is found, the identity and contact information for that individual is identified. If a partial match is determined (e.g., when multiple stored hashes are close), the identities of the stored hashes that are close are displayed on the user's computing device. The user's selection of the correct identity of the pictured individual is then received, and the system can identify the contact information for that individual based on the stored data. If the comparison leads to no match, then the image of the non-matched individual is displayed to the user, along with a request for user input of a correct identity and contact information.

Once all identity and contact information is collected for the individuals pictured, the system can allow the user to adjust the requested contribution amount for each individual or remove or add individuals from the grouping. A contribution request is then transmitted to each remaining individual, using the contact information. This allows the individuals pictured to provide their contribution to the user or to some account (e.g., a financial account associated with a charity).

FIG. 1 provides a block diagram illustrating a system and environment 100, in accordance with an embodiment of the invention. As illustrated in FIG. 1, the environment 100 includes a managing entity system 200, a computing device system 300, a facial recognition application system 120, a stored image hash server 130, and one or more third party systems 140 (e.g., social media networks or platforms, data provider platforms, image analysis systems, and the like). The system environment 100 may also include a user 110 associated with the computing device system 300. As used herein, the term "user" refers to any person or entity that is associated with the managing entity system 200. For example, the user 110 may be a customer of a financial institution that comprises the managing entity system 200.

The managing entity system 200, the computing device system 300, the facial recognition application system 120, the stored image hash server 130, and the third party system 140 may be configured to communicate over a network 150. This network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network 152.

The managing entity system 200 is in network communication with the computing device system 300, the facial recognition application system 120, the stored image hash server 130, and the third party system(s) 140 in such a way to enable the managing entity system 200 to perform or instruct the performance of one or more of the process steps described herein. In some embodiments, the managing entity system 200 is owned or otherwise controlled by a managing entity, where the managing entity is any entity that can transmit contribution requests (e.g., transaction requests) to individuals based on facial recognition analysis of a received image.

The managing entity system 200 is configured to control or instruct the execution of one or more devices, databases, or systems in the system environment 100 to perform certain functions. For example, the managing entity system 200 may be configured to perform or instruct the performance of at least some of the steps of process 400, as described with respect to FIG. 4, and/or of process 500 described, as described with respect to FIG. 5. Therefore, the managing entity system 200 may be configured to receive prompts, requests, data, instructions, user input, and the like from the computing device system 300 that is associated with the user 110. Additionally, the managing entity system 200 may be configured to transmit requests, data, signals, commands, computer readable instructions, and the like to the computing device system 300, including instructions that cause the computing device system 300 to display images, notifications, requests for user input, user input data fields, and the like.

Furthermore, in some embodiments, the managing entity system 200 is configured to transmit image data, instructions, and stored image hashes to a facial recognition application system 120 and to receive extracted image data hashes and/or a report on whether the extracted image hashes match the stored image hashes. While the facial recognition application system 120 is illustrated in FIG. 1 as a system that is remote to the managing entity system 200, it should be noted that this facial recognition application system 120 can be at least partially incorporated within the managing entity system 200.

The managing entity system 200 may also be configured to read, write, view, reformat, compare, or otherwise access data stored in the stored image hash server 130, such that comparisons to extracted image hashes can be made to stored image hashes of the stored image hash server 130.

Additionally, the managing entity system 200 may be configured to trawl, analyze, extract, copy, save, or otherwise access third party systems 140 for data extraction, compliance, research, and other activities. For example, the managing entity system 200 may be configured to access one or more social network systems of the user 110 to identify images associated with social media connections of the user 110. The managing entity system 200 can then analyze these images using the facial recognition application system 120 to generate image hashes for faces of each connection to the user 110, and store these generated image hashes in the stored image hash server 130 for later comparison (e.g., the comparison steps illustrated in FIGS. 4 and 5).

The managing entity system 200 is described in further detail with respect to FIG. 2.

The computing device system 300 is in network communication with the managing entity system 200, the facial recognition application system 120, the stored image hash server 130, and the third party system(s) 140 in such a way to enable the computing device system to receive data, perform certain steps based on instructions from the managing entity system 200 or another system, and communicate instructions to and from the user 110. The computing device system 300 is described in further detail with respect to FIG. 2.

The facial recognition application system 120 may be accessed and/or used by the managing entity system 200 and/or the computing device system 300 to perform facial recognition analysis of images, where the output is an image hash of at least a region of the image associated with a face. In some embodiments, the facial recognition application system 120 is also configured to compare extracted or newly received image hashes with known or stored image hashes. In such embodiments, the facial recognition application system 120 may be configured to access data stored in the stored image hash server 130, the managing entity system 200, the computing device system 300 and/or a third party system 140.

The stored image hash server 130 comprises a database of known, stored image hashes generated by the facial recognition application system 120 or the managing entity system 200, and/or received from a third party system 140 like a third party data provider. This stored image hash server 130 may also store data related to the stored image hashes. For example, identity information, contact information, a source of the identity or contact information, a date of the last image hash, related image hashes (e.g., image hashes for the same individual), and the like. This related data can be linked to its respective image hash data such that a comparison or identification of the stored image hash data can return identity and contact information for an individual as well. In some embodiments, the stored image hash server 130 includes a relational database.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a facial recognition application 250 which includes image hash data 252 and identity data 254, a contribution request application 260 which includes contact data 262, and other computer-executable instructions or other data. The computer-executable program code of the network server application 240, the facial recognition application 250, and/or the contribution request application 260 may instruct the processing device 220 to perform certain logic, data-processing, and data-storing functions of the managing entity system 200 described herein, as well as communication functions of the managing entity system 200.

In one embodiment, the facial recognition application 250 includes image hash data 252 and identity data 254. The image hash data 252 may comprise image hashes for faces of contacts or connections of the user 110. This image hash data 252 may be stored within the managing entity system 200, and/or it may be stored or linked with a storage device of the computing device system 300, the facial recognition application system 120, and/or the stored image hash server 130.

The identity data 254 may include data associated with identities of the contacts and/or connections of the user 110. This identity data 254 may comprise name information, unique identifier information, financial account information, and the like. In some embodiments, each item of identity data 254 is linked or otherwise connected with at least one item of the image hash data 252, such that the image hash data 252 of one individual's face is associated with the identity data 254 for that same individual.

In one embodiment, the contribution request application 260 includes contact data 262. This contact data 262 may include information on a communication channels that can be used to contact an individual. For example, the contact data 262 may include phone numbers, email addresses, physical addresses, communication application information (e.g., a username for a messaging or person-to-person payment application), and the like. The contribution request application 260 may be configured to transmit requests for an individual to contribute a certain amount to the user 110 by transmitting the request via the communication channel associated with the contact data 262 for that individual. In some embodiments, the contact data 262 is linked or otherwise connected with related image hash data 252 and/or identity data 254.

The network server application 240, the facial recognition application 250, and the contribution request application 260 are configured to invoke or use the image hash data 252, the identity data 254, the contact data 262, and the like when communicating through the network communication interface 210 with the computing device system 300, the facial recognition application system 120, the stored image hash server 130, and/or the third party system 140.

As used herein, a "communication interface" generally includes a modem, server, transceiver, and/or other device for communicating with other devices on a network, and/or a user interface for communicating with one or more customers. Referring again to FIG. 2, the network communication interface 210 is a communication interface having one or more communication devices configured to communicate with one or more other devices on the network 150, such as the computing device system 300, the facial recognition application system 120, the stored image hash server 130, and/or the third party system 140, and the like. The processing device 220 is configured to use the network communication interface 210 to transmit and/or receive data and/or commands to and/or from the other devices connected to the network 150.

FIG. 3 provides a block diagram illustrating a computing device system 300 of FIG. 1 in more detail, in accordance with embodiments of the invention. In one embodiment of the invention, the computing device system 300 is a mobile telephone. However, it should be understood that a mobile telephone is merely illustrative of one type of computing device system 300 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, laptop computers, cameras, video recorders, audio/video player, radio, GPS devices, desktop computers, workstations, or any combination of the aforementioned.

Some embodiments of the computing device system 300 include a processor 310 communicably coupled to such devices as a memory 320, user output devices 336, user input devices 340, a network interface 360, a power source 315, a clock or other timer 350, a camera 380, and a positioning system device 375. The processor 310, and other processors described herein, generally include circuitry for implementing communication and/or logic functions of the computing device system 300. For example, the processor 310 may include a digital signal processor device, a microprocessor device, and various analog to digital converters, digital to analog converters, and/or other support circuits. Control and signal processing functions of the computing device system 300 are allocated between these devices according to their respective capabilities. The processor 310 thus may also include the functionality to encode and interleave messages and data prior to modulation and transmission. The processor 310 can additionally include an internal data modem. Further, the processor 310 may include functionality to operate one or more software programs, which may be stored in the memory 320. For example, the processor 310 may be capable of operating a connectivity program, such as a web browser application 322. The web browser application 322 may then allow the computing device system 300 to transmit and receive web content, such as, for example, location-based content and/or other web page content, according to a Wireless Application Protocol (WAP), Hypertext Transfer Protocol (HTTP), and/or the like.

The processor 310 is configured to use the network interface 360 to communicate with one or more other devices on the network 150. In this regard, the network interface 360 includes an antenna 376 operatively coupled to a transmitter 374 and a receiver 372 (together a "transceiver"). The processor 310 is configured to provide signals to and receive signals from the transmitter 374 and receiver 372, respectively. The signals may include signaling information in accordance with the air interface standard of the applicable cellular system of the wireless telephone network 152. In this regard, the computing device system 300 may be configured to operate with one or more air interface standards, communication protocols, modulation types, and access types. By way of illustration, the computing device system 300 may be configured to operate in accordance with any of a number of first, second, third, and/or fourth-generation communication protocols and/or the like. For example, the computing device system 300 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The computing device system 300 may also be configured to operate in accordance with non-cellular communication mechanisms, such as via a wireless local area network (WLAN) or other communication/data networks.

As described above, the computing device system 300 has a user interface that is, like other user interfaces described herein, made up of user output devices 336 and/or user input devices 340. The user output devices 336 include a display 330 (e.g., a liquid crystal display or the like) and a speaker 332 or other audio device, which are operatively coupled to the processor 310.

The user input devices 340, which allow the computing device system 300 to receive data from a user such as the user 110, may include any of a number of devices allowing the computing device system 300 to receive data from the user 110, such as a keypad, keyboard, touch-screen, touchpad, microphone, mouse, joystick, other pointer device, button, soft key, and/or other input device(s). The user interface may also include a camera 380, such as a digital camera.

The computing device system 300 may also include a positioning system device 375 that is configured to be used by a positioning system to determine a location of the computing device system 300. For example, the positioning system device 375 may include a GPS transceiver. In some embodiments, the positioning system device 375 is at least partially made up of the antenna 376, transmitter 374, and receiver 372 described above. For example, in one embodiment, triangulation of cellular signals may be used to identify the approximate or exact geographical location of the computing device system 300. In other embodiments, the positioning system device 375 includes a proximity sensor or transmitter, such as an RFID tag, that can sense or be sensed by devices known to be located proximate a merchant or other location to determine that the computing device system 300 is located proximate these known devices. The positioning system device 375 may play a crucial role in transmitting location information associated with the computing device system 300 for determining when the computing device system 300 is in at or is in close proximity to a resource location.

The computing device system 300 further includes a power source 315, such as a battery, for powering various circuits and other devices that are used to operate the computing device system 300. Embodiments of the computing device system 300 may also include a clock or other timer 350 configured to determine and, in some cases, communicate actual or relative time to the processor 310 or one or more other devices.

The computing device system 300 also includes a memory 320 operatively coupled to the processor 310. As used herein, memory includes any computer readable medium (as defined herein below) configured to store data, code, or other information. The memory 320 may include volatile memory, such as volatile Random Access Memory (RAM) including a cache area for the temporary storage of data. The memory 320 may also include non-volatile memory, which can be embedded and/or may be removable. The non-volatile memory can additionally or alternatively include an electrically erasable programmable read-only memory (EEPROM), flash memory or the like.

The memory 320 can store any of a number of applications which comprise computer-executable instructions/code executed by the processor 310 to implement the functions of the computing device system 300 and/or one or more of the process/method steps described herein. For example, the memory 320 may include such applications as a conventional web browser application 322 and/or an image-based contribution application 321 (or any other application provided by the managing entity system 200). These applications also typically instructions to a graphical user interface (GUI) on the display 330 that allows the user 110 to interact with the computing device system 300, the managing entity system 200, and/or other devices or systems. In one embodiment of the invention, when the user 110 decides to enroll in an image-based contribution application 321 program, the user 110 downloads, is assigned, or otherwise obtains the image-based contribution application 321 from the managing entity system 200, or from a distinct application server (e.g., from the facial recognition application system 120 or the third party system 140). In other embodiments of the invention, the user 110 interacts with the managing entity system 200 or the via the web browser application 322 in addition to, or instead of, the image-based contribution application 321.

The memory 320 of the computing device system 300 may comprise a Short Message Service (SMS) application 323 configured to send, receive, and store data, information, communications, alerts, and the like via the wireless telephone network 152.

The image-based contribution application 321 may be configured to transmit prompts and requests that are input by the user 110, receive data and instructions from a managing entity system 200, and the like. For example, the image-based contribution application 321 may be configured to prompt the managing entity system 200 to perform a request for contribution from a group of individuals. The image-based contribution application 321 may be activated by the managing entity system 200 and display instructions to provide an image of the group of individuals to the managing entity system. These instructions may include instructions to select an image from the memory 320 of the computing device system 300 and/or to capture a new image using the camera 380. The image-based contribution application 321 can then transmit this image to the managing entity system 200.

The image-based contribution application 321 can also receive instructions from the managing entity system 200 to cause the display 330 of the computing device system 300 to present notifications, images (e.g., an image of an unidentified individual from the image), requests for user input, user input fields, selectable icons, superimposed text or images, and the like. The image-based contribution application 321 can also automatically transmit received user input (e.g., from one of the user input devices 340) to the managing entity system 200. Furthermore, the image-based contribution application 321 can instruct the managing entity system 200 to transmit requests for contribution amounts from certain individuals.

In some embodiments, once the user 110 has installed and/or registered for the image-based contribution application 321 on the computing device system 300, the image-based contribution application may immediately identify the contacts of the user 110 in a contact list stored on or accessible by the computing device system 300, along with profile pictures of each contact. Additionally, the image-based contribution application 321 can access social media network data of the user 110 to identify images, identity information, and contact information of the social media connections of the user 110. The image-based contribution application 321 can then transmit all of this data to the managing entity system 200, and the managing entity system can perform the initial facial recognition and image hashing processes to generate image hashes of the face of each contact or connection of the user 110, associate the image generate hashes with identity and contact information for each contact or connection of the user 110, and store at least some of this data in the stored image hash server 130, the computing device system 300 memory 320, a third party system 140, and/or within the managing entity system 200.

The memory 320 can also store any of a number of pieces of information, and data, used by the computing device system 300 and the applications and devices that make up the computing device system 300 or are in communication with the computing device system 300 to implement the functions of the computing device system 300 and/or the other systems described herein. For example, the memory 320 may include such data as identity and contact information, profile pictures linked to the identity and contact information, and the like.

Referring now to FIG. 4, a flowchart is provided to illustrate embodiments of a process 400 for execution of multiple events based on image data extraction and evaluation, in accordance with embodiments of the invention. In some embodiments, the process 400 may include block 402, where the system receives a prompt from a user to request a contribution from one or more individuals. In response to this prompt, the system may cause a computing device of the user to request a user input of an image of the individuals to whom the request(s) for contribution will be sent. Additionally or alternatively, the system may cause the computing device of the user to activate the camera application and prompt the user to take a picture of the group of individuals that the user would like to request a contribution from.

The process 400 then proceeds to block 404, where the system receives an image that includes one or more individuals. This image may be associated with some overall event, dinner, merchandise purchase, charity event, or the like, where the user is paying a total contribution amount, but would like for the other individuals in the user's group to provide at least a portion of that contribution amount. For example, the group of individuals may be at a dinner, and a group picture is taken. This image can be transmitted by the user to the system to indicate which individuals were at the dinner and therefore should receive a request for contribution. In some embodiments, multiple images may be received (e.g., the group of individuals is comprised by all (or at least some) of the individuals pictured in both images). In such embodiments, the system may determine that the same individual is pictured multiple times in the multiple images (based on the image hash, as described later), and therefore will ignore the duplicate instances of the individual.

Next, the system may apply a facial recognition process to the image to extract image hashes for each face in the image, as shown in block 406. The system may use a face detection algorithm to identify an area of the image associated with a face, where each face is one of the one or more individuals in the received image. This face detection algorithm can identify an area of the image most likely to be a single face by formulating five bounding planes in the two dimensional subspace distribution, where the five bounding planes are generated using rules that enclose a specific color region associated with skin and/or facial features. This area most likely associated with a single face is then analyzed using an image hashing technique.

Once the image hashes have been extracted for each face in the image, the system may then compare the extracted image hashes to known, stored image hashes, as shown in block 408. These known image hashes may be associated with contacts of the user (or the user itself), and gathered from images known to be associated with those contacts of the user. For example, in some embodiments, the known image hashes are generated from contact images related to the user's contact list in the user's mobile phone or personal or work computer. In some embodiments, the known image hashes are generated from the user's connections in one or more social media networks or platforms. The system may have analyzed these known images of the user's contacts and connections before the process 400 begins, such that the system already has a database of known image hashes that are linked or otherwise associated with the respective contact or connection of the user. In this way, the system can compare the extracted image hash values to those known, stored image hash values to see whether the individuals in pictured in the image match the individual contacts or connections of the user.

The known, stored hash data can be received and/or generated in a number of ways or from a number of sources. For example, in some embodiments, a third party facial recognition hash data provider may provide the managing entity with a database of known image hashes and its related identity and/or contact information.

In other embodiments, the system may generate the known image hashes itself. For example, once the user 110 has downloaded and/or enrolled in a program associated with the image-based contribution application 321 of FIG. 3, the system may access a database (e.g., a mobile contact list) of the computing device system 300 of the user 110 to identify contacts of the user 110, images associated with those contacts (e.g., profile pictures, contact pictures, tagged or otherwise labeled pictures stored in the computing device system 300 or in a separate database that is easily accessed by the computing device system 300), and the contact information for those contacts. Additionally or alternatively, the system can perform a similar task to contacts of the user 110 in one or more social network platforms.

The system can then use the facial recognition process to extract an image hash of the face of each contact, storing this image hash with the data already known about the individual in a server or other database (e.g., a relational database) that is easily accessible by the managing entity system 200. In other embodiments, one or more of the image hashes may be stored directly in a data cache of the computing device of the user 110 (e.g., a mobile device of the user). In either embodiment, the system is able to access this resource for storing known image hashes and the related identity and contact information for each known image hash. The system can then easily access the databases to perform the comparison step of block 408.

In some embodiments, known image hashes created based off of a contact list in a computing device of the user may be stored locally on the computing device of the user while known image hashes created based off of social network data may be stored remotely in a database owned or otherwise controlled by the managing entity. In such embodiments, the comparison step of block 408 may comprise an initial comparison of the extracted image hash with the known image hashes stored locally on the computing device of the user (i.e., image hashes generated from computing device contact list data). If a complete match is found, the system does not need to perform any additional comparisons. However, if a complete match is not found, the system can then compare the extracted image hash to known image hashes stored in the remote server (i.e., image hashes generated from social network data). In this way, the system can reduce the processing requirements needed to perform the data comparisons and generally should reduce the amount of time needed to determine identity and contact information associated with extracted image hashes.

When the system determines that an extracted hash matches a known, stored hash (as shown in block 410), the process can then proceed to block 412, where the system identifies identity and contact information for the extracted image hash. In this way, the system has identified an individual pictured in the received image and located the contact information necessary to communicate a contribution request (e.g., a payment transaction request) to that individual.

However, the system may not be able to confidently match an extracted image hash with the known, stored image hashes. In one such embodiment, the system may determine that an extracted hash matches two or more known, stored hashes (i.e., image hashes that are associated with more than one individual contact or connection of the user), as shown in block 414. In such cases, the system may display the identities associated with the known, stored image hashes to the user (e.g., via a computing device of the user), as shown in block 416. This display can also include a request for a selection of one of the displayed identities (or an input of a new identity not shown). The system may then receive a selection of a correct identity for the extracted image hash, which allows the system to identity the contact information for the that correct identity, as shown in block 418. The system has again determined an identity and contact information for an individual pictured in the received image. In such embodiments, the system can use machine learning, based on the feedback from the user input, to better identify which contact is associated with a similar image hash in future instances.

In another embodiment where the system has not confidently matched an extracted image hash with a known, stored image hash, the system, the system may determine that an extracted hash does not match any known, stored image hash, as shown in block 420. In some such embodiments, the process may proceed to block 422, where the system requests the identity and contact information associated with the extracted image hash. This request may include a display on a computing device of the user that allows the user to enter the requested information in appropriate data fields.

The system may then receive the identity and contact information for the extracted image hash, as shown in block 424. Once again, this allows the system to determine an identity and contact information for an individual pictured in the received image. Additionally, the system can store this newly received identity, contact information, and the extracted image hash in a database of known image hashes and their respective information for later use.

Once all extracted image hashes have been paired with an identity and contact information for a specific individual, the process 400 can proceed to block 426, where the system collects all identity and contact information for each of the one or more individuals pictured in the received image. At this point, the user may set certain contribution amounts for one or more of the individuals (which in some embodiments includes the user), deadlines for execution of the contribution, messages to be sent to one or more of the individuals, and the like.

In some embodiments, the user may provide, to the system, a specific amount due for each of the one or more individuals. In other embodiments, the user may provide a total contribution amount, and the system divides the request equally among the individuals. Again, the user may be one of the users in some embodiments, so this equal division may include the user or may exclude the user. In such embodiments, the system may provide a recommended distribution by breaking the total contribution up among each of the individuals evenly, but the system can also allow the user to adjust or confirm the recommended contribution amount for each of the individuals before the request is sent out.

Additionally or alternatively, the system can get location information, event or merchant name, event or merchant type, or the like from calendar data of the user. For example, the system can determine that the user has taken an image or transmitted the prompt at a time when the user's calendar indicates that the user is at a sporting event. The system can then recommend that the location of the sporting event, the sporting event type, the date and time of the sporting event, the location of the sporting event, a transaction type (e.g., ticket purchase, concessions purchase, merchandise purchase, and the like), and the like to the user before transmitting the request for contribution to the individuals. In this way, the system allows the individuals to see more information about what the contribution is actually being used for, or why the contribution is being requested in the first place.

In some embodiments, the system can additionally request that the user take a picture of a receipt associated with the total contribution. For example, if the user has paid a bill for the individuals at a restaurant, the user can take a picture of the receipt. The system would then use an optical character recognition process to identify the total value of the receipt, and then recommend that the receipt is divided amongst all individuals in the image of the one or more individuals. Additionally, the system could extract itemized data from the receipt and request input from the user about which item of the receipt should be charged to which individual from the group image. Of course, the system could also access the transaction history of the user, request confirmation that a receipt from a merchant associated with the user is the receipt to use for requesting contributions from the individuals, and then perform the same steps as noted above.

Finally, the process 400 may proceed to block 428, where the system transmits the contribution request to each of the one or more individuals using the contact information. In some embodiments, the contribution request is a request for an individual to execute a transaction, payment, or other financial operation. For example, the user may have taken an image of a group of people at a dinner where the user picked up the check, but wants others in the group to pay back some portion of the total bill. The system can receive the total amount of the bill from the user, divide the bill evenly by the number of individuals in the image (unless the user provides specialized input indicating how much each pictured individual should pay), and transmit out a request for the appropriate amount to be paid back to the user.

Each request for transaction can be considered an "event" that is being executed based on the evaluation and extraction of the image data received from the computing device of the user.

Information like the location of a restaurant for which the contribution is requests reimbursement for the user's payment of the bill can be identified from global positioning system data of the computing device of the user, either at the time the image was taken and/or at the time the user inputs the prompt to the managing system to initiate the request for contribution.

The system can allow for adjustments in contribution amounts from an individual. For example, if the individual would like to contribute a greater amount than the requested contribution amount, then the system can allow the individual to input the greater amount. Additionally, the individual can challenge or otherwise request a different amount to be charged by the user. This request for a changed amount can be communicated to the computing device of the user and the user can accept, adjust, or decline the request.

In some embodiments, the system may additionally process the transactions, either through a link provided in the transmitted request for the contribution or through a person-to-person payment application owned by the managing entity.

Once the requests for contributions have been transmitted to the computing devices of each of the users, the system can monitor transaction data of the user to determine a status of the contribution for each individual. For example, the system can continuously monitor the user's transaction data to determine whether how much one individual owes the user, how much the individual has already paid to the user, whether the individual has fully paid the contribution amount, and the like. This monitoring can span across multiple contribution requests, such the system maintains an amount owed to the user for all individuals across all contribution requests.

In some such embodiments, the system can use the outstanding contribution amount data to provide reports to the user, either in a simple for or as outstanding contribution amounts superimposed over an image of the individual's face. Furthermore, as the system can identify images stored on the user's computing device that include an individual that has an outstanding contribution amount (i.e., by performing facial recognition processes on the image and matching the extracted image has to a known image hash for the individual), the system can associate the outstanding contribution amount, the image of the individual, and the location of the face of the individual in the image of the individual. As such, when the user views an image of the individual with the outstanding contribution amount, the system can superimpose the outstanding contribution amount over, next to, on top of, or near the face of that individual. Of course, this process can be done for multiple individuals, and can be done for the image received in block 404, such that a summary of how much each individual still owes (or an indication that an individual has fully paid) is presented to the user via the image of the group of individuals.

While the system is described with respect to identifying individuals in an image to request contributions from, it should be noted that other techniques for identifying these individuals can be used, either as standalone solutions or in conjunction with the practice of identifying the individuals using the image. For example, the system may use the computing device of the user (or a computing device of a merchant) to scan a nearby region using Wi-Fi, Bluetooth, GPS data, mobile device (e.g., cell phone, wearable device) signatures, and the like to identify the presence of devices associated with contacts or connections of the user. For example, the system may have a database of device signatures or other identifying features of mobile devices of each contact of the user. When that device signature is identified by the system (e.g., after the system is prompted to request a contribution from individuals), the system can determine identity and contact information associated with those devices, thereby identifying the individuals at a location that are likely to be part of the request to provide a contribution to the user. In some embodiments, the system may allow the user to transmit this image to one or more users to indicate how much each individual still owes on the contribution.

Referring now to FIG. 5, a flowchart is provided to illustrate one embodiment of a process 500 for execution of multiple events based on image data extraction and evaluation, in accordance with embodiments of the invention. In some embodiments, the process 500 may include block 502, where the system receives, from a computing device of the user, a prompt to request a contribution from one or more individuals. Generally, this request for a contribution may be a request for payment, a request for reimbursement, a request for a charity donation, a request for information (e.g., a poll), and the like. In one example, the one or more individuals may have eaten dinner at a restaurant together and the user picked up the bill, but all individuals would like to reimburse the user. The user can then initiate this process 500 to request appropriate reimbursement from each other individual of the one or more individuals.

In some embodiments, the system can respond to this prompt by requesting the transmittal of an image, requesting certain input information (e.g., a total amount of contribution to be requested, and the like), and the like. The request for an image may be a simple request for an image currently stored in the computing device of the user or, in some embodiments, can include an option to access the camera device of the computing device of the user to capture a new image associated with the prompt.

In some embodiments, the process 500 includes block 504, where the system receives, from the computing device of the user, an image that includes the one or more individuals. Again, this image may be from a stored image in the computing device of the user or may be a newly acquired image from a camera of the computing device of the user. Either way, the computing device of the user transmits the image to the system.

As mentioned above, the request for contributions may be associated with a group of individuals that would like to reimburse a user for a total transaction amount. Therefore, in some embodiments, the received image may be directly associated with the scenario that lead to the total transaction. For example, this received image may be of all individuals that shared a meal that the user initially paid for. However, in other embodiments, the user may know which individuals it wants to receive a contribution from and selects an image of at least those individuals from a database. The received image may include the face of the user, in addition to the other individuals. As described below, the system may be able to identify the user and would not necessarily request a contribution from the user unless the user requests as much.

Additionally, in some embodiments, the process 500 includes block 506, where the system determines an identity for each of the one or more individuals in the image by applying a facial recognition process to the image to extract image hashes for each face in the image and comparing the extracted image hashes to stored hashes of the computing device of the user or to stored hashes of a social network of the user. As described above with respect to FIG. 4, the system may have one or more databases of known image hashes and their related identity and contact information. These databases may be stored locally on the computing device of the user and/or in a remote server accessible by the managing entity system, such that the system can perform a comparison of each of the extracted image hashes to known, stored image hashes in one or more of the databases.

In some embodiments, the system stores all known hashes and related information in a single database. In other embodiments, the system may store some known image hashes (e.g., known image hashes generated from a contact list of a mobile device of the user) in a cache or database of the computing device of the user while other known image hashes (e.g., known image hashes generated from social network data) are stored in a remote server owned or otherwise controlled by the system. In some such embodiments, the system may initially compare the extracted image hashes to the locally stored image hash data to determine whether an extracted image hash is associated with a close contact of the user. The user's contact list stored on the user's mobile device likely comprises the closest contacts of the user, as the user is likely to be in more regular contact with these individuals than individuals in the user's social network that are not included in the user's mobile device contact list. In this way, the system may be able to determine matches without having to sift through what is likely a larger database of known image hashes that were generated from the social network data of the user.

Additionally, and as mentioned above with respect to FIG. 4, there are generally three outcomes of the comparison step. First, the comparison can lead to a full match, where the system determines that the extracted image hash matches perfectly or within a predetermined margin of error of a known, stored image hash. In such embodiments, the system can then identify the identity and contact information for the individual associated with the extracted image hash.

Second, the comparison can lead to a determination that an extracted image hash does not match any known, stored image hashes. In such embodiments, the system can determine that a first extracted image hash of the extracted image hashes is not associated with the stored hashes of the computing device of the user or with the stored hashes of the social network of the user. The system can then cause the computing device of the user to display a portion of the image associated with the first image hash. This portion of the image will include the face of the individual associated with that first image hash, so the user should be able to identify the individual based on the image of the individual's face. The system can also cause the computing device of the user to request an input of a new identity and a new contact information associated with the first extracted image hash. In this way, the user can see the picture of the individual that could not be matched, and provide an input of the identity and contact information needed to request the contribution from that individual. When the user inputs the identity and contact information, the system will receive, from the computing device of the user, the new identity and contact information, which can be included in the determined identity and identified contact information for each of the one or more individuals in this process 500.

Third, the comparison can lead to a partial match where the system cannot determine a complete match for a single stored image hash. In such embodiments, the system can determine that a first extracted image hash of the extracted image hashes at least partially matches with two or more of the stored hashes of the computing device of the user or the stored hashes of the social network of the user. The partial match may be a determination that the extracted image hash matches within a certain standard of error with multiple known, stored image hashes. This situation could occur when individuals with similar features (e.g., twins) are in a user's contact list or social network, and when the system is analyzing an extracted image hash of one of these individuals. In such embodiments, the system can cause the computing device of the user to display at least a portion of the image associated with the first image hash. Again, this will display at least an image of the individual's face, which should help the user identify the individual. The system can also cause the computing device of the user display identities associated with the two or more stored hashes that are partial matches to the extracted image hash. For example, the system may cause the computing device to display an image of the individual's face and provide two or more selectable buttons or icons with suggested names or other identity information for the two or more stored image hashes that were a partial match with the extracted image hash. The user can then select the name or identity information for the correct identity of this individual, which is grouped into the determined identity of each of the one or more individuals in the image. This correct identity is now associated with the first extracted image hash.

In any of the above described embodiments, if the system determines that identified identity and/or contact information is missing or appears to not be correct, the system can display such information on the computing device of the user along with a request for a confirmation that the identified information is correct or a user input of the correct information. The confirmed or received information can then be used in subsequent steps directed towards requesting the contribution from the individual.

In some embodiments, not all individuals that the user would like to request a contribution from are included in the received image. In such cases, the user can provide a new image that includes the additional individuals, or the user can input an identity of the additional individual (or select the identity from a drop-down or auto-fill input field). If the system has access to contact information for this additional individual, then the identity and contact information of that individual is grouped into the identity and contact information for the individuals pictured in the received image. If the system does not have access to contact information for the additional individual, the system can request the contact information from the user.

The process 500 may also include block 508, where the system identifies contact information for each of the one or more individuals based on the identity of each of the one or more individuals. This contact information may comprise email, mobile device numbers, SMS messaging, online portal messaging, mobile application messaging, payment vehicle information, and the like for each of the identified individuals. This contact information is necessary to allow the system to establish a communication channel with each of the individuals from the received image and to transmit requests, information, and prompts to those individuals over the communication channel.

Once the system has identified the individuals and collected contact information for each of the individuals, the system may cause the computing device of the user to display a request for a user input of a respective contribution amount for each individual of the one or more individuals. This respective contribution amount may be a percentage of a total contribution amount, a specific contribution amount, a suggested contribution amount, and the like. Additionally, the system can allow the user to provide additional notes about the contribution, a deadline for providing the contribution, a reason for the request for the contribution, line item information for the contribution, and the like, for each respective contribution of each of the individuals. The system can then receive, from the computing device of the user, the user input of the respective contribution amount for each individual of the one or more individuals.

Finally, the process 500 includes block 510, where the system transmits the request for the contribution to each individual of the identified one or more individuals using the contact information. Of course, in embodiments where the user is identified in the image as one of the one or more individuals, the system may refrain from transmitting a contribution request to the user, and may exclude the user from certain calculations in determining a contribution amount for each individual.

The transmission of the request for the contribution may be made to a computing device an individual via email, text message, online web portal, and the like, such that the individual is able to execute or otherwise perform the contribution on the computing device of the individual. For example, the request for the contribution may comprise a link to an online payment portal where the requested amount of the contribution, a name of the payee (i.e., the user), and any additional transaction information may be displayed in the request. The individual can then provide the contribution by entering payment information of the individual and authorizing a payment amount to be sent to a financial account of the user as the contribution of the individual.

In embodiments where the user has provided a specific or suggested contribution amount for an individual, the system may transmit an indication of this specific or suggested contribution amount to the individual as part of the request for the contribution.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing.

Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for execution of multiple events based on image data extraction and evaluation, the system comprising:
   a memory device; and
   a processing device operatively coupled to the memory device, wherein the processing device is configured to execute computer-readable program code to:
      receive, from a computing device of a user, a prompt to request a contribution from one or more individuals;
      receive, from the computing device of the user, an image that includes the one or more individuals;

determine an identity for each of the one or more individuals in the image by applying a facial recognition process to the image to extract image hashes for each face in the image and comparing the extracted image hashes to stored hashes of the computing device of the user or to stored hashes of a social network of the user;

identify contact information for each of the one or more individuals based on the identity of each of the one or more individuals;

in response to identifying contact information for each individual of the identified one or more individuals, cause the computing device of the user to display the identity and contact information for each of the one or more individuals in the image;

cause the computing device of the user to display a request for a user input of a respective contribution amount for each individual of the one or more individuals;

receive, from the computing device of the user, the user input of the contribution amount for each individual of the one or more individuals; and transmit the request for the contribution to each individual of the one or more individuals using the contact information, wherein transmitting the request for the contribution to each individual of the identified one or more individuals comprises transmitting a request for the respective contribution amount to each individual of the one or more individuals.

2. The system of claim 1, wherein the processing device is further configured to execute computer-readable program code to:

determine that a first extracted image hash of the extracted image hashes is not associated with the stored hashes of the computing device of the user or with the stored hashes of the social network of the user;

cause the computing device of the user to display a portion of the image associated with the first image hash;

cause the computing device of the user to request an input of a new identity and a new contact information associated with the first extracted image hash; and receive, from the computing device of the user, the new contact information.

3. The system of claim 1, wherein the processing device is further configured to execute computer-readable program code to:

determine that a first extracted image hash of the extracted image hashes at least partially matches with two or more of the stored hashes of the computing device of the user or the stored hashes of the social network of the user;

cause the computing device of the user to display a portion of the image associated with the first image hash;

cause the computing device of the user to display identities associated with the two or more stored hashes;

cause the computing device of the user to request a user input of a correct identity of the displayed identities associated with the two or more stored hashes;

receive, from the computing device of the user, the user input of the correct identity; and associate the correct identity with the first extracted image hash.

4. The system of claim 1, wherein the contribution comprises an equal distribution amount for each individual of the one or more individuals.

5. The system of claim 1, wherein the identity of the identified one or more individuals includes an identity of the user.

6. The system of claim 5, wherein the request for the contribution is not transmitted to the user.

7. The system of claim 1, wherein the computing device of the user comprises a mobile device.

8. A computer program product for execution of multiple events based on image data extraction and evaluation, the computer program product comprising at least one non-transitory computer readable medium comprising computer readable instructions, the instructions comprising instructions for:

receiving, from a computing device of a user, a prompt to request a contribution from one or more individuals;

receiving, from the computing device of the user, an image that includes the one or more individuals;

determining an identity for each of the one or more individuals in the image by applying a facial recognition process to the image to extract image hashes for each face in the image and comparing the extracted image hashes to stored hashes of the computing device of the user or to stored hashes of a social network of the user;

identifying contact information for each of the one or more individuals based on the identity of each of the one or more individuals;

in response to identifying contact information for each individual of the identified one or more individuals, causing the computing device of the user to display the identity and contact information for each of the one or more individuals in the image;

causing the computing device of the user to display a request for a user input of a respective contribution amount for each individual of the one or more individuals;

receiving, from the computing device of the user, the user input of the respective contribution amount for each individual of the one or more individuals; and transmitting the request for the contribution to each individual of the one or more individuals using the contact information, wherein transmitting the request for the contribution to each individual of the identified one or more individuals comprises transmitting a request for the respective contribution amount to each individual of the one or more individuals.

9. The computer program product of claim 8, wherein the computer readable instructions further comprise instructions for:

determining that a first extracted image hash of the extracted image hashes is not associated with the stored hashes of the computing device of the user or with the stored hashes of the social network of the user;

causing the computing device of the user to display a portion of the image associated with the first image hash;

causing the computing device of the user to request an input of a new identity and a new contact information associated with the first extracted image hash; and receiving, from the computing device of the user, the new contact information.

10. The computer program product of claim 8, wherein the computer readable instructions further comprise instructions for:

determining that a first extracted image hash of the extracted image hashes at least partially matches with two or more of the stored hashes of the computing device of the user or the stored hashes of the social network of the user;

causing the computing device of the user to display a portion of the image associated with the first image hash;

causing the computing device of the user to display identities associated with the two or more stored hashes;

causing the computing device of the user to request a user input of a correct identity of the displayed identities associated with the two or more stored hashes;

receiving, from the computing device of the user, the user input of the correct identity; and associating the correct identity with the first extracted image hash.

11. The computer program product of claim 8, wherein the contribution comprises an equal distribution amount for each individual of the one or more individuals.

12. The computer program product of claim 8, wherein the identity of the identified one or more individuals includes an identity of the user.

13. The computer program product of claim 12, wherein the request for the contribution is not transmitted to the user.

14. The computer program product of claim 8, wherein the computing device of the user comprises a mobile device.

15. A computer implemented method for execution of multiple events based on image data extraction and evaluation, said computer implemented method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving, from a computing device of a user, a prompt to request a contribution from one or more individuals;

receiving, from the computing device of the user, an image that includes the one or more individuals;

determining an identity for each of the one or more individuals in the image by applying a facial recognition process to the image to extract image hashes for each face in the image and comparing the extracted image hashes to stored hashes of the computing device of the user or to stored hashes of a social network of the user;

identifying contact information for each of the one or more individuals based on the identity of each of the one or more individuals;

in response to identifying contact information for each individual of the identified one or more individuals, causing the computing device of the user to display the identity and contact information for each of the one or more individuals in the image;

causing the computing device of the user to display a request for a user input of a respective contribution amount for each individual of the one or more individuals;

receiving, from the computing device of the user, the user input of the respective contribution amount for each individual of the one or more individuals; and transmitting the request for the contribution to each individual of the one or more individuals using the contact information, wherein transmitting the request for the contribution to each individual of the identified one or more individuals comprises transmitting a request for the respective contribution amount to each individual of the one or more individuals.

16. The computer implemented method of claim 15, further comprising:

determining that a first extracted image hash of the extracted image hashes is not associated with the stored hashes of the computing device of the user or with the stored hashes of the social network of the user;

causing the computing device of the user to display a portion of the image associated with the first image hash;

causing the computing device of the user to request an input of a new identity and a new contact information associated with the first extracted image hash; and receiving, from the computing device of the user, the new contact information.

17. The computer implemented method of claim 15, further comprising:

determining that a first extracted image hash of the extracted image hashes at least partially matches with two or more of the stored hashes of the computing device of the user or the stored hashes of the social network of the user;

causing the computing device of the user to display a portion of the image associated with the first image hash;

causing the computing device of the user to display identities associated with the two or more stored hashes;

causing the computing device of the user to request a user input of a correct identity of the displayed identities associated with the two or more stored hashes;

receiving, from the computing device of the user, the user input of the correct identity; and associating the correct identity with the first extracted image hash.

18. The computer implemented method of claim 15, wherein the contribution comprises an equal distribution amount for each individual of the one or more individuals.

19. The computer implemented method of claim 15, wherein the identity of the identified one or more individuals includes an identity of the user and wherein the request for the contribution is not transmitted to the user.

20. The computer implemented method of claim 15, wherein the computing device of the user comprises a mobile device.

* * * * *